United States Patent Office 3,573,322
Patented Mar. 30, 1971

3,573,322
POLYHYDROAZEPINO[2,3-b]INDOLES
Jackson B. Hester, Jr., Portage, Mich., assignor to The Upjohn Company, Kalamazoo, Mich.
No Drawing. Filed Feb. 28, 1969, Ser. No. 803,480
Int. Cl. C07d 27/36
U.S. Cl. 260—326.3               9 Claims

ABSTRACT OF THE DISCLOSURE

New polyhydroazepino[2,3-b]indoles of the Formula XIV:

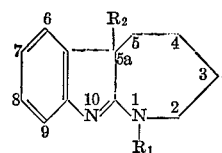

wherein $R_1$ is selected from the group consisting of hydrogen, ethyl and acetyl and wherein $R_2$ is selected from the group consisting of hydrogen, hydroxy and acetoxy with the proviso that $R_2$ is acetoxy only if $R_1$ is hydrogen or acetyl, are prepared. These compounds and their pharmacologically acceptable acid addition salts have sedative action and can be used in mammals and birds as tranquilizers.

BACKGROUND OF THE INVENTION

Field of the invention

The present invention is concerned with new organic compounds and more particularly with novel perhydroazepino[2,3-b]indoles and acid addition salts thereof, intermediates and a process of production thereof.

The processes of production for the compounds of the present invention can be illustratively represented as follows:

Method A

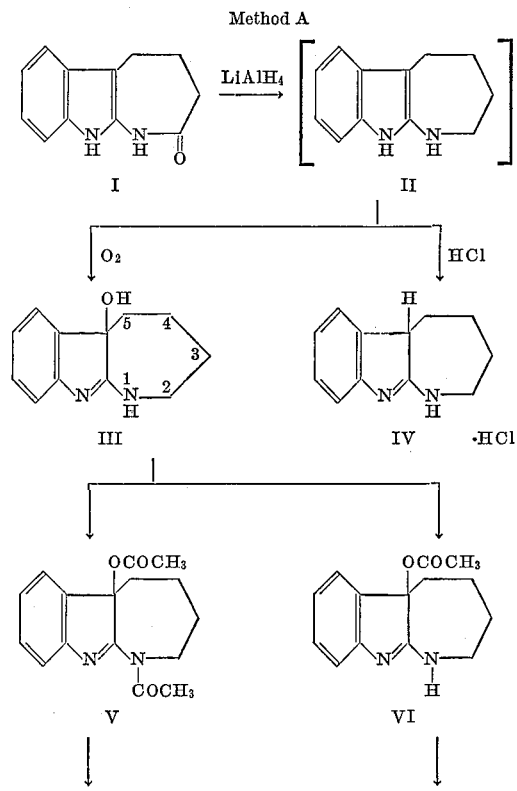

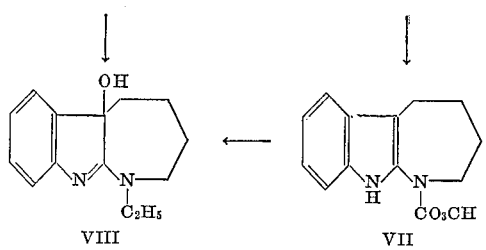

Method B

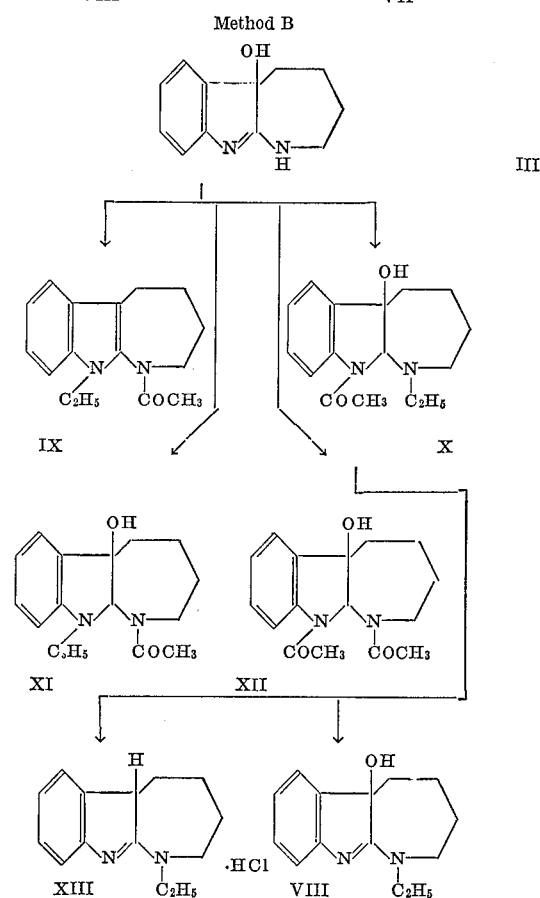

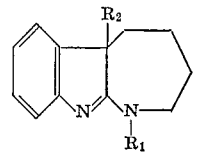

The important products of this invention can be represented by the Formula XIV:

$$\text{XIV}$$

wherein $R_1$ is selected from the group consisting of hydrogen, ethyl and acetyl and wherein $R_2$ is selected from the group consisting of hydrogen, hydroxy and acetoxy with the proviso that $R_2$ is acetoxy only if $R_1$ is hydrogen or acetyl, and the pharmacologically acceptable acid addition salts thereof.

The process of this invention comprises the following steps: reducing 3,4,5,10-tetrahydroazepino[2,3-b]indole-2(1H)-one (I) (Belgian Pat. No. 705,424) with lithium aluminum hydride to obtain II and permitting II to react with air oxygen to obtain 2,3,4,5-tetrahydroazepino-[2,3-b]indol-5a-(1H)-ol (III) or permitting II to react with alcoholic hydrogen chloride to give 1,2,3,4,5,5a-hexahydroazepino[2,3-b]indole hydrochloride (IV); treating compound III with acetic anhydride in pyridine to give 1-acetyl-2,3,4,5-tetrahydroazepino[2,3-b]indole-5a-(1H)-ol acetate ester (V) and 2,3,4,5-tetrahydroazepino[2,3-b]indol-5a-(1H)-ol acetate ester (VI); reducing compound V with lithium aluminum hydride and allowing the product to be in contact with air oxygen yielded 1-ethyl-2,3,4,5-tetrahydroazepino[2,3-b]indol-5a(1H)-ol (VIII); reducing compound VI in acetic anhydride with hydrogen and a palladium catalyst yielded 1-acetyl-1,2,3,4,5,10-hexahydroazepino[2,3-b]indole (VII) which when reduced in the same manner as compound V yielded 1-ethyl-2,3,4,5-tetrahydroazepino[2,3-b]indole-5a(1H)-ol (VIII).

The process of Method B comprises hydrogenating 2,3,4,5-tetrahydroazepino[2,3-b]indol-5a(1H)-ol in acetic anhydride in the presence of a palladium-on-charcoal catalyst to yield:

1-acetyl-10-ethyl-1,2,3,4,5,10-hexahydroazepino-[2,3-b]indole (IX);
10-acetyl-1-ethyl-2,3,4,5,10,10a-hexahydroazepino-[2,3-b]indol-5a(1H)-ol (X);
1-acetyl-10-ethyl-2,3,4,5,10,10a-hexahydroazepino-[2,3-b]indol-5a(1H)-ol (XI); and
1,10-diacetyl-2,3,4,5,10,10a-hexahydroazepino-[2,3-b]indol-5a(1H)-ol (XII);

treating compound X with p-toluenesulfonic acid, then sodium ethoxide and permitting the reaction mixture to be in contact with air oxygen to yield 1-ethyl-2,3,4,5-tetrahydroazepino[2,3-b]indol-5a(1H)-ol (VIII), treating compound X with p-toluenesulfonic acid and then hydrochloric acid to yield 1-ethyl-1,2,3,4,5,5a-hexahydroazepino[2,3-b]indole (XIII) as the hydrochloride.

DESCRIPTION OF THE PREFERRED EMBODIMENT

The novel compounds of the Formula XIV including acid addition salts of the amino compounds have sedative and tranquilizing effects in mammals and birds.

The acid addition salts of compounds of Formula XIV, contemplated in this invention, are the hydrochlorides, hydrobromides, hydroiodides, sulfates, phosphates, acetates, lactates, tartrates, citrates, salicylates, succinates, malates, maleates, pamoates, cyclohexanesulfamates, methanesulfonates and the like, prepared by reacting a compound of Formula XIV wherein $R_1$ is alkyl as defined above or hydrogen with the stoichiometrically calculated amount of the selected pharmacologically acceptable acid.

Sedative effects of 2,3,4,5-tetrahydroazepino[2,3-b]-indol-5a(1H)-ol as its hydrochloride are shown by the following tests in mice:

Chimney test [Med. Exp. 4, 11, (1961)]: The effective dosage for 50% of mice ($ED_{50}$) is 20 mg./kg. The test determines the ability of mice to back up and out of a vertical glass cylinder within 30 seconds. At the effective dosage, 50% of the mice failed to do this.

Dish test: Mice in Petri dishes (10 cm. diameter, 5 cm. high, partially embedded in wood shavings) climb out in a very short time, when not treated. Mice remaining in the dish for more than 3 minutes indicates tranquilization. $ED_{50}$ equals the dose of test compound at which 50% of the mice remain in the dish. $ED_{50}$ (intraperitoneal administration) in this test was 15 mg./kg.

Nicotine antagonism test: Mice in groups of 6 were injected with 2,3,4,5-tetrahydroazepino[2,3-b]indol-5a-(1H)-ol hydrochloride. Thirty minutes later the mice including control (untreated) mice are injected with 2 mg./kg. nicotine salicylate. The control mice show overstimulation, i.e., (1) running convulsions followed by (2) tonic extensor fits; followed by (3) death. A dosage of 13 mg./kg. protected 50% of the mice against (2) and 15 mg./kg. against (3) ($ED_{50}$).

The pharmaceutical forms contemplated by this invention include pharmaceutical compositions suited for oral, parenteral and rectal use, e.g., ointment, lotions, tablets, oils, powder packets, cachets, dragees, capsules, solutions suspensions, sterile injectible forms, suppositories, bougies and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be added.

For mammals and birds food premixes, with starch, oatmeal, dried fishmeat, fishmeal, flour and the like can be prepared.

As tranquilizer the compounds of Formula XIV can be used in dosages of 5–100 mg./kg. in oral or injectable preparations as described above, to alleviate tension and anxiety in mammals or birds, such as e.g., occurs when animals are in travel.

Other acid addition salts of the amine compounds of Formula XIV can be made such as the fluosilicic acid addition salts which are useful mothproofing compounds or the trichloroacetates useful as herbicides against Johnson, Bermuda, yellow foxtail, green foxtail and quack grasses.

In carrying out the process of present invention according to Method A, 3,4,5,10-tetrahydroazepino[2,3-b]-indol-2(1H)-one (I) was reduced with lithium aluminum hydride in a solvent such as tetrahydrofuran, ether, benzene or mixtures thereof. The lithium aluminum hydride is generally used in a large excess, such as from 2 to 10 times the amount stoichiometrically required. After all of the lithium aluminum hydride has been added, the mixture is refluxed from 2 to 24 hours and decomposed with water and a base such as aqueous sodium hydroxide. After filtration, to remove solid particles, the filtrate containing 1,2,3,4,5,10-hexahydroazepino[2,3-b]indole (II) is acidified with a mineral acid e.g., hydrochloric acid, to give 1,2,3,4,5,5a-hexahydroazepino[2,3-b]indole hydrochloride (IV) which is recovered and purified by conventional procedures, e.g., recrystallization, decolorization with activated charcoal, and the like.

In the same manner, reducing 3,4,5,10-tetrahydroazepino[2,3-b]indol-2(1H)-one with lithium aluminum hydride, decomposing the reaction mixture and filtering and then stirring the thus-produced compound II in air for 1 to 4 days produces 2,3,4,5-tetrahydroazepino[2,3-b]indol-5a(1H)-ol (III).

Acetylation of III in conventional manner with an acetylating agent, e.g. acetic anhydride or acetyl halides such as acetyl bromide or acetyl chloride, in pyridine at room temperature provides 1-acetyl-2,3,4,5-tetrahydroazepino[2,3-b]indol-5a(1H)-ol acetate ester (V) and 2,3,4,5-tetrahydroazepino[2,3-b]indol-5a(1H)-ol acetate ester (VI). In the preferred embodiment of this invention the acetylating agent and pyridine is used in a large excess. The products are separated by chromatography.

Compound V is reduced with lithium aluminum hydride in an inert organic solvent e.g., tetrahydrofuran, ether and the like. After heating the reaction mixture to reflux, the excess reagent is decomposed with water and sodium hydroxide and the product after air oxidation is 1-ethyl-2,3,4,5-tetrahydroazepino[2,3-b]indol-5a(1H)-ol (VIII) which is recovered and purified by standard procedures e.g., chromatography, extraction, recrystallization and the like.

Compound III is hydrogenated in the presence of a palladium-on-carbon catalyst and in acetic anhydride suspension. In the preferred embodiment of this invention, 2,3,4,5-tetrahydroazepino[2,3-b]indol-5a(1H)-ol with about half of the amount by weight of 10% palladium-on-carbon catalyst and about 25–150 ml. of acetic anhydride per gram is hydrogenated for a period of 4 to 12 hours at 20 to 60 p.s.i. hydrogen pressure. Four products are obtained, namely:

1-acetyl-10-ethyl-1,2,3,4,5,10-hexahydroazepino[2,3-b] indol (IX);
10-acetyl-1-ethyl-2,3,4,5,10,10a-hexahydroazepino[2,3-b] indol-5a(1H)-ol (X);

1-acetyl-10-ethyl-2,3,4,5,10,10a-hexahydroazepino[2,3-b]
indol-5a(1H)-ol (XI);

1,10-diacetyl-2,3,4,5,10,10a-hexahydroazepino[2,3-b]
indol-5a(1H)-ol (XII).

These products are separated from each other by chromatography, using ethyl acetate and Skellysolve B hexanes as eluents.

Heating 1 - ethyl - 10-acetyl-2,3,4,5,10,10a-hexahydroazepino[2,3-b]indol-5a(1H)-ol (X) with p-toluenesulfonic acid in an organic solvent such as benzene, cyclohexane or the like in a nitrogen atmosphere between 70–110° C. after evaporation of the solvent yields an oil, treatment of this oil with an alkali metal alkoxide, e.g., sodium or potassium methoxide or ethoxide in excess of alkanol e.g., methanol or ethanol at room temperature in air yields 1-ethyl-2,3,4,5-tetrahydroazepino[2,3-b]indol-5a(1H)-ol (VIII) which is recovered and purified by standard procedures such as extraction, chromatography, recrystallization and the like.

Treating compound X with p-toluenesulfonic acid at reflux temperature in an organic solvent e.g., benzene, cyclohexane, heptane, toluene or the like, and then with a mineral acid, gives the acid addition salt of 1-ethyl-1,2,3,4,5,5a-hexahydroazepino[2,3-b]indole.

The following examples are illustrative of the process and products of the present invention, but are not to be construed as limiting.

EXAMPLE 1

*1,2,3,4,5,5a-hexahydroazepino[2,3-b]indole hydrochloride*

3,4,5,10 - tetrahydroazepino[2,3 - b]indol -2 (1H)-one (1.00 g., 5.00 mmoles) was added, under nitrogen, to an ice cold, stirred suspension of lithium aluminum hydride (1.0 g.) in tetrahydrofuran (100 ml.). The resulting mixture was refluxed for 18 hours, cooled in an ice bath and treated successively with water (1 ml.) 15% aqueous sodium hydroxide (1.ml.) and water (3 ml.). This mixture was filtered into a flask containing methanolic hydrogen chloride and the filtrate concentrated in vacuo to give a residue. A solution of the residue in water was decolorized with activated charcoal (Darco G–60) and concentrated in vacuo to give a residue. A solution of this residue in absolute ethanol was again concentrated in vacuo. The resulting crystalline product was recrystallized first from ethanol-ethyl acetate and then from methanol-ethyl acetate to give 0.362 g. (32.5%) of 1,2,3,4,5,5a-hexahydroazepino [2,3-b]indole hydrochloride of melting point 254–257° C. (dec.). The analytical sample of melting point 253.5–255.5° C. was prepared by recrystallizing this material from methanol-ethyl acetate.

U.V.: $\lambda$ max. 215 and 273 m$\mu$ ($\epsilon$ 18,000 and 10,150 respectively) with inflections at 265, 269 and 280 m$\mu$ ($\epsilon$ 9550; 9900 and 7400 respectively).

*Analysis.*—Calcd. for $C_{12}H_{15}ClN_2$ (percent): C, 64.71; H, 6.79; Cl, 15.92; N, 12.58. Found (percent): C, 64.65; H, 6.90; Cl, 16.08; N, 12.54.

EXAMPLE 2

*2,3,4,5 - tetrahydroazepino[2,3-b]indol-5a(1H)-ol, its hydrochloride and hydrobromide*

3,4,5,10 - tetrahydroazepino[2,3 - b]indol - 2(1H) - one (12.7 g., 0.0634 mole) was added, under nitrogen, to an ice cold, stirred suspension of lithium aluminum hydride (13 g.) in tetrahydrofuran (1300 ml.). The resulting mixture was refluxed for 15 hours, cooled in an ice bath and successively treated with water (13 ml.), 15% aqueous sodium hydroxide solution (13 ml.) and water (39 ml.). This mixture was stirred for a few minutes and filtered. The filtrate was concentrated in vacuo to give a residue. A solution of the residue in methanol was stored at 0° C. for 2 days and crystallized to give 4.80 g. of melting point 252.5–253.5° C. (dec.); 2.99 g. of melting point 248.5–250° C. (dec.) and 1.30 g. of melting point 247–248.5° C. (dec.) (70.8% yield) of 2,3,4,5-tetrahydroazepino[2,3-b] indol-5a(1H)-ol. The analytical sample of melting point 255–259.5° C., was prepared by recrystallizing this material from methanol.

U.V.: $\lambda$ max. 223, 280, 290 and 319 m$\mu$ ($\epsilon$ 23,060; 10,030; 9270 and 4300 respectively).

*Analysis.*—Calcd. for $C_{12}H_{14}N_2O$ (percent): C, 71.26; H, 6.98; N, 13.85. Found (percent): C, 70.82; H, 6.99; N, 13.64.

A solution of 2,3,4,5-tetrahydroazepino[2,3-b]indol-5a-(1H)-ol in methanol was acidified with methanolic hydrogen chloride and the resulting salt was crystallized from methanol to give 2,3,4,5-tetrahydroazepino[2,3-b]indol-5a-(1H)-ol hydrochloride of melting point 229.5–230.5° C. (dec.).

U.V.: $\lambda$ max. 221, 224, 269, 278 and 299 m$\mu$ ($\epsilon$ 19,650; 19,700; 5700; 5550 and 4200 respectively) with an inflection at 293 m$\mu$ ($\epsilon$ 4150).

*Analysis.*—Calcd. for $C_{12}H_{15}ClN_2O$ (percent): C, 60.37; H, 6.33; Cl, 14.86; N, 11.74. Found (percent): C, 60.44; H, 6.63; Cl, 15.00; N, 11.52.

A solution of 2,3,4,5-tetrahydroazepino[2,3-b]indol-5a-(1H)-ol in methanol was acidified with methanolic hydrogen bromide and the resulting salt was crystallized from methanol-ethyl acetate to give 2,3,4,5-tetrahydroazepino-[2,3-b]indol-5a(1H)-ol hydrobromide of melting point 205.5–206.5° C. (dec.).

U.V.: $\lambda$ max. 219, 268, 278 and 290.5 m$\mu$ ($\epsilon$ 19,500; 5660; 5800 and 4360 respectively, with inflections at 223, and 300 m$\mu$ ($\epsilon$ 19,800 and 2560 respectively).

*Analysis.*—Calcd. for $C_{12}H_{15}BrN_2O$ (percent): C, 50.89; H, 5.34; Br, 28.22; N, 9.90. Found (percent): C, 50.82; H, 5.47; Br, 28.23; N, 10.14.

EXAMPLE 3

*1 - acetyl - 2,3,4,5-tetrahydroazepino[2,3-b]indol-5a(1H)-ol acetate ester; 2,3,4,5-tetrahydroazepino[2,3-b]indol-5a(1H)-ol acetate ester*

A stirred mixture of 2,3,4,5-tetrahydroazepino[2,3-b] indol-5a(1H)-ol (1.02 g., 5.05 mmoles) (Example 2), acetic anhydride (3 ml.) and pyridine (50 ml.) was kept at ambient temperature, in the dark, under nitrogen, for 18 hours and concentrated in vacuo to give a residue. A solution of the residue in xylene was concentrated in vacuo to remove last traces of pyridine and acetic anhydride. The residue was chromatographed on silica gel (50 g.); 10 ml. fractions were collected. The first compound was eluted with 40% ethyl acetate-60% cyclohexane and was crystallized from ethyl acetate-Skellysolve B hexanes to give 0.377 g. (26.1%) of 1-acetyl-2,3,4,5-tetrahydroazepino[2,3-b]indol-5a(1H)-ol of melting point 127.5–128.5° C. The analytical sample of melting point 127.5–129° C., was prepared by recrystallizing some of this material from ethyl acetate-Skellysolve B hexanes.

U.V.: $\lambda$ max 230, 287, 297 and 309 m$\mu$ ($\epsilon$ 20,100, 8310, 9720 and 9410 respectively).

*Analysis.*—Calcd. for $C_{16}H_{18}N_2O_3$ (percent): C, 67.11; H, 6.34; N, 9.78. Found (percent): C, 67.29; H, 6.79; N, 9.57.

The second compound was eluted from the column with 50% pyridine-ethyl acetate and was crystallized from methylene chloride-ethyl acetate to give 0.308 g. (25%) of 2,3,4,5-tetrahydroazepino[2,3-b]indol-5a(1H)-ol acetate ester of melting point 172–173° C. (dec.). The analytical sample of melting point 176° C. (dec.), was prepared by recrystallizing some of this material from methylene chloride-ethyl acetate.

U.V.: $\lambda$ max. 282, 292 and 320 m$\mu$ ($\epsilon$ 10,200; 9190 and 3990 respectively).

*Analysis.*—Calcd. for $C_{14}H_{16}N_2O_2$ (percent): C, 68.83; H, 6.60; N, 11.47. Found (percent): C, 68.16; H, 6.67; N, 11.43.

EXAMPLE 4

*1 - ethyl - 2,3,4,5-tetrahydroazepino[2,3-b]indol-5a(1H)-ol and 2,3,4,5-tetrahydroazepino[2,3-b]indol-5a(1H)-ol*

1 - acetyl - 2,3,4,5 - tetrahydroazepino[2,3 - b]indol-5a-(1-H)-ol acetate ester (300 mg.) was added, under nitrogen, to an ice cold, stirred suspension of lithium aluminum hydride (300 mg.) in tetrahydrofuran (30 ml.) and the mixture was refluxed for 18 hours, cooled in an ice bath and treated successively with water (0.3 ml.), 15% aqueous sodium hydroxide (0.3 ml.) and water (0.09 ml.). This mixture was filtered and the filtrate was concentrated in vacuo to give a residue. The residue was chromatographed on silica gel (15 g.) with 2% diethylamine-3% methanol-95% ethyl acetate. The first compound eluted from the column was crystallized from methanol-ethyl acetate to give 1-ethyl-2,3,4,5-tetrahydroazepino[2,3-b]indol-5a(1H)-ol of melting point 252.5–253.5° C. (dec.), which was identical to the authentic sample by comparison of the infrared (Nujol) and ultraviolet spectra. The second compound eluted from the column was crystallized from methanol to give 2,3,4,5-tetrahydroazepino[2,3-b]indol-5a(1H)-ol, of melting point 248.5–251.5° C. (dec.).

EXAMPLE 5

*1-acetyl-1,2,3,4,5,10-hexahydroazepino[2,3-b]indole*

A mixture of 2,3,4,5-tetrahydroazepino[2,3-b]indol-5a-(1H)-ol acetate ester (1.00 g., 4.09 mmoles), 10% palladium-on-carbon (0.5 g.) and acetic anhydride (100 ml.) was hydrogenated at an initial pressure of 30 p.s.i. for 8 hours, and filtered through Celite. The filtrate was concentrated in vacuo to give a residue. A solution of the residue in xylene was concentrated in vacuo to remove last traces of acetic anhydride. This residue was crystallized from ethyl acetate to give 0.362 g. of 1-acetyl-1,2,3,4,5,10-hexahydroazepino[2,3-b]indole of melting point 192–193.5° C.

EXAMPLE 6

*1 - ethyl - 2,3,4,5 - tetrahydroazepino[2,3-b]indol-5a(1H)-ol from 1 - acetyl-1,2,3,4,5,10-hexahydroazepino[2,3-b]indole*

1-acetyl - 1,2,3,4,5,10 - hexahydroazepino[2,3-b]indole (0.500 g., 2.19 mmole) was added under nitrogen to an ice cold, stirred suspension of lithium aluminum hydride (0.500 g.) in tetrahydrofuran (50 ml.). The resulting mixture was refluxed for 17 hours, cooled in an ice bath and treated successively with water (0.5 ml.), 15% aqueous sodium hydroxide (0.5 ml.) and water (1.5 ml.). The mixture was stirred for a few minutes and filtered. The filtrate was concentrated under reduced pressure to give a residue. The residue was dissolved in methanol, filtered to remove a small amount of flocculent solid and crystallized from methanol-ethyl acetate to give 0.279 g. of melting point 250–252° C. (dec.), and 0.100 g. of melting point 248.5–251.5° C. (dec.), (75.2%) of 1-ethyl - 2,3,4,5 - tetrahydroazepino[2,3-b]indol-5a-(1H)-ol. The analytical sample of melting point 251.5–252.5° C. (dec.) was prepared by recrystallizing some of this material from methanol.

U.V.: λ max. 224, 282, 291 and 320 mμ (ε 21,400; 11,400; 11,150 and 5370 respectively).

*Analysis.*—Calcd. for $C_{14}H_{18}N_2O$ (percent): C, 73.01; H, 7.88; N, 12.17. Found (percent): C, 73.08; H, 7.67; N, 12.20.

EXAMPLE 7

*1 - acetyl - 10 - ethyl-1,2,3,4,5,10-hexahydroazepino[2,3-b]indole; 10-acetyl - 1 - ethyl - 1,2,3,4,5,10,10a-hexahydroazepino[2,3-b]indol - 5a(1H)-ol; 1-acetyl-10-ethyl-2,3,4,5,10,10a-hexahydroazepino[2,3-b]indol - 5a(1H)-ol; 1,10-diacetyl-2,3,4,5,10,10a - hexahydroazepino[2,3-b]indol-5a(1H)-ol*

A mixture of 2,3,4,5-tetrahydroazepino[2,3-b]indol-5a-(1H)-ol (7.00 g., 0.0346 mole), 10% palladium-on-carbon (3.5 g.) and acetic anhydride (700 ml.) was hydrogenated at an initial pressure of 30 p.s.i. for 8 hours and allowed to stand under hydrogen for an additional 16 hours. It was then filtered through Celite diatomaceous earth and the filtrate was concentrated in vacuo to give a residue. A solution of the residue in xylene was concentrated in vacuo to remove last traces of acetic anhydride and the residual oil was chromatographed on silica gel (400 g.); 70 ml. fractions were collected. Fractions 1–120 were eluted with 30% ethyl acetate-70% Skellysolve B hexanes and 121–240 were eluted with ethyl acetate. The first compound was eluted in fractions 34–50 and was crystallized from ethyl acetate-Skellysolve B hexanes to give 0.658 g. of melting point 141–142.5° C.; 0.183 g. of melting point 140–142° C., and 0.053 g. of melting point point 138.5–140.5° C. (10.8% yield) of 1-acetyl-10-ethyl - 1,2,3,4,5,10-hexahydroazepino[2,3-b]indole. The analytical sample of melting point 140.5–141.5° C., was prepared by recrystallizing some of this material from ethyl acetate-Skellysolve B hexanes.

U.V.: λ max. 226, 284 and 293 mμ (ε 39,750; 9230 and 7870 respectively) with an inflection at 278 mμ (ε 8520).

*Analysis.*—Calcd. for $C_{16}H_{20}N_2O$ (percent): C, 74.96; H, 7.86. Found (percent): C, 74.89; H, 7.83.

The second compound was eluted in fractions 58–88 and was crystallized from ethyl acetate-Skellysolve B hexanes tho give 2.30 g. of melting point 162.5–164° C., and 0.185 g. of melting point 161.5–162.5° C. (26.2% yield) of 10-acetyl-1 - ethyl - 2,3,4,5,10,10a-hexahydroazepino[2,3-b]indol-5a(1H)-ol. The analytical sample of melting point 164–165° C., was prepared by recrystallizing some of this material from ethyl acetate.

U.V.: λ max. 248 mμ (ε 13,900) and inflections at 278 and 286 mμ (ε 2460 and 1685 respectively).

*Analysis.*—Calcd. for $C_{16}H_{22}N_2O_2$ (percent): C, 70.04; H, 8.08; N, 10.21. Found (percent): C, 69.98; H, 8.21; N, 10.19.

The third compound was eluted from the column in fractions 152–164 and crystallized from ethyl acetate-Skellysolve B hexanes to give 0.261 g. of melting point 124–125° C. and 0.094 g. of melting point 117.5–119° C. (3.74%) of 1-acetyl-10 - ethyl - 2,3,4,5,10,10a-hexahydroazepino[2,3-b]indol-5a(1H)-ol. The analytical sample of melting point 111.5–112.5° C. was prepared by recrystallizing this material from ethyl acetat-Skellysolve B hexanes.

U.V.: λ max. 208,251 and 309 mμ (ε 34,200; 13,840 and 2670 respectively).

*Analysis.*—Calcd. for $C_{16}H_{22}H_2O_2$ (percent): C, 70.04; H, 8.08; N, 10.21. Found (percent): C, 70.12; H, 8.22; N, 10.31.

The fourth compound was eluted in fractions 176–240 and was crystallized from methanol-ethyl acetate to give 2.58 g. (25.8%) of 1,10-diacetyl-2,3,4,5,10,10a-hexahydroazepino[2,3-b]indol-5a(1H)-ol of melting point 199–201° C. The analytical sample of melting point 200–201° C., was prepared by recrystallizing some of this material from methanol-ethyl acetate.

U.V.: λ max. 246, 278 and 287 mμ (ε 14,150, 2040 and 1600 respectively).

*Analysis.*—Calcd. for $C_{16}H_{20}N_2O_3$ (percent): C, 66.64; H, 6.99; N, 9.72. Found (percent): C, 66.31; H, 6.96; N, 9.55.

EXAMPLE 8

*1 - ethyl - 2,3,4,5 - tetrahydroazepino[2,3-b]indol-5a(1H)-ol from 10 - acetyl-1-ethyl-2,3,4,5,10,10a-hexahydroazepino[2,3-b]indol-5a(1H)-ol*

A solution of 10-acetyl-1-ethyl-2,3,4,5,10,10a-hexahydroazepino[2,3-b]indol - 5a(1H)-ol (100 mg., 0.365 mmole) and p-toluenesulfonic acid (10 mg.) in benzene (10 ml.) was refluxed under nitrogen for 1.5 hours. The cooled solution was washed with water, dried over anhydrous magnesium sulfate and concentrated in vacuo to give a non-crystalline oil. A solution of this oil in absolute ethanol (1 ml.) was added under nitrogen to a stirred solution of sodium (17 mg.) in ethanol (2 ml.), and the resulting solution was kept at ambient temperature for 35 minutes and poured into water. This mixture was extracted with methylene chloride. The extract was dried over anhydrous magnesium sulfate and concentrated to give a residue. Crystallization of the residue from methanol-ethyl acetate gave 43 mg. (51%) of 1-ethyl - 2,3,4,5 - tetrahydroazepino[2,3-b]indol-5a(1H)-ol, of melting point 245–251° C. (dec.).

EXAMPLE 9

*1-ethyl-1,2,3,4,5,5a-hexahydroazepino[2,3-b]indole hydrochloride*

A mixture of 10-acetyl-1-ethyl-2,3,4,5,10,10a-hexahydroazepino[2,3-b]indol-5a(1H)-ol (250 mg.), p-toluenesulfonic acid (20 mg.) and benzene (25 ml.) was refluxed, under nitrogen, for 1.5 hours. The resulting solution was cooled, washed with cold water, dried over anhydrous magnesium sulfate and concentrated in vacuo to give a residue. The residue was dissolved in petroleum ether, filtered through silica gel and concentrated; no crystalline material could be obtained. The oil which was obtained was acidified with ethereal hydrogen chloride and the resulting salt was crystallized from ethanol-ethyl acetate to give 94 mg. of 1-ethyl-1,2,3,4,5,5a-hexahydroazepino[2,3-b]indole hydrochloride of melting point 226–228° C. (dec.). The analytical sample of melting point 226.5–228° C. was prepared by recrystallizing this material from methanol-ethyl acetate.

U.V.: λ max. 216 and 274 mμ (ε 18,640 and 12,720 respectively) with slight inflections at 265, 269 and 283 mμ (ε 10,640; 11,760 and 10,550 respectively).

*Analysis.*—Calcd. for $C_{14}H_{19}ClN_2$ (percent): C, 67.05; H, 7.64; N, 11.17; Cl, 14.14. Found (percent): C, 66.59; H, 7.70; N, 10.96; Cl, 13.86.

EXAMPLE 10

*Reaction of 1-acetyl - 2,3,4,5 - tetrahydroazepino[2,3-b] indol-5a(1H)-ol acetate ester with sodium hydroxide*

A stirred mixture of 1-acetyl-2,3,4,5-tetrahydroazepino-[2,3-b]indol-5a(1H)-ol acetate ester (100 mg., 0.350 mmole) and absolute ethanol (10 ml.), under nitrogen, was treated with 0.320 ml. of 1.113 N aqueous sodium hydroxide solution and the resulting solution was kept at ambient temperature for 50 minutes, and poured into ice water. This mixture was extracted with methylene chloride. The extract was dried over anhydrous potassium carbonate and concentrated in vacuo to give a residue. Crystallization of the residue from methanol gave 28 mg. of 2,3,4,5-tetrahydroazepino[2,3-b]indol - 5a(1H)-ol, of melting point 250.5–254.5° C. (dec.). Recrystallization from methanol gave material of a melting point 252–253.5° C. (dec.).

I claim:

1. A compound of the formula

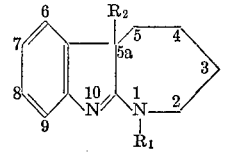

wherein $R_1$ is selected from the group consisting of hydrogen, ethyl and acetyl and wherein $R_2$ is selected from the group consisting of hydrogen, hydroxy and acetoxy with the proviso that $R_2$ is acetoxy only if $R_1$ is hydrogen or acetyl and the pharmacologically acceptable acid addition salts thereof.

2. A compound according to claim 1 as a hydrochloride, wherein $R_1$ and $R_2$ are hydrogen and the compound is therefore 1,2,3,4,5,5a-hexahydroazepino[2,3-b]indole hydrochloride.

3. A compound according to claim 1, wherein $R_1$ is hydrogen and $R_2$ is hydroxy and the compound is therefore 2,3,4,5-tetrahydroazepino[2,3-b]indol-5a(1H)-ol.

4. The compound of claim 3 as hydrochloride.

5. The compound of claim 3 as hydrobromide.

6. A compound according to claim 1 wherein $R_1$ is acetyl and $R_2$ is acetoxy and the compound is therefore 1-acetyl-2,3,4,5-tetrahydroazepino[2,3-b]indol - 5a(1H)- ol acetate ester.

7. A compound according to claim 1 wherein $R_1$ is hydrogen and $R_2$ is acetoxy and the compound is therefore 2,3,4,5-tetrahydroazepino[2,3-b]indol-5a(1H)-ol acetate ester.

8. A compound according to claim 1 wherein $R_1$ is ethyl and $R_2$ is hydroxy and the compound is therefore 1-ethyl-2,3,4,5-tetrahydroazepino[2,3-b]indol-5a(1H)-ol.

9. A compound according to claim 1, as a hydrochloride, wherein $R_1$ is ethyl and $R_2$ is hydrogen and the compound is therefore 1-ethyl-1,2,3,4,5,5a-hexahydroazepino[2,3-b]indole hydrochloride.

References Cited

UNITED STATES PATENTS 3,419,569   12/1968   Renner.

ALEX MAZEL, Primary Examiner

J. A. NARCAVAGE, Assistant Examiner

U.S. Cl. X.R.

260—326.5, 326.9; 424—274; 71—95

UNITED STATES PATENT OFFICE
CERTIFICATE OF CORRECTION

Patent No. 3,573,322         Dated    March 30, 1971

Inventor(s)  Jackson B. Hester, Jr.

It is certified that error appears in the above-identified patent and that said Letters Patent are hereby corrected as shown below:

Column 2, Formula VII, should appear as shown below instead of as in the patent:

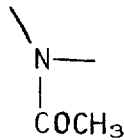

Column 4, line 60, for "(1H)-of" read -- (1H)-ol --. Cc 5, line 38, for "(1. ml.)" read -- (1 ml.) --. Column 7, lir for "5a(1-H)" read -- 5a(1H) --; line 10, for "(0.09 ml.)" re -- (0.9 ml.) --. Column 8, line 16, for "melting point point read -- melting point --; line 45, for "acetat-" read -- acet --; line 47, for "208,251" read -- 208, 251--.

Signed and sealed this 2nd day of November 1971.

(SEAL)
Attest:

EDWARD M.FLETCHER,JR.         ROBERT GOTTSCHALK
Attesting Officer             Acting Commissioner of Paten